(No Model.) 2 Sheets—Sheet 1.

G. MAYR.
DRIVING MECHANISM FOR BICYCLE DYNAMOS.

No. 553,035. Patented Jan. 14, 1896.

Witnesses:
@. C. Lake
Arthur S. Levy

Inventor:
George Mayr
By A. Clinton Tanner
Atty.

(No Model.) 2 Sheets—Sheet 2.
G. MAYR.
DRIVING MECHANISM FOR BICYCLE DYNAMOS.
No. 553,035. Patented Jan. 14, 1896.
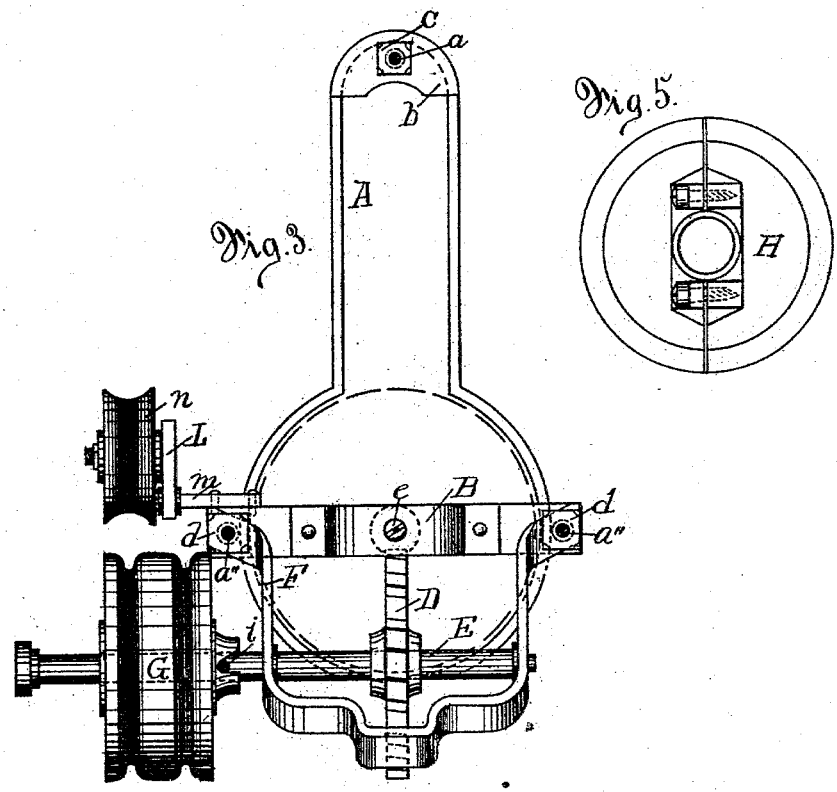
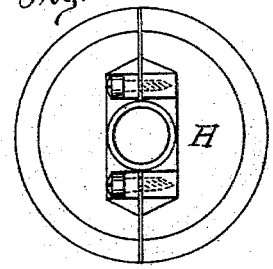
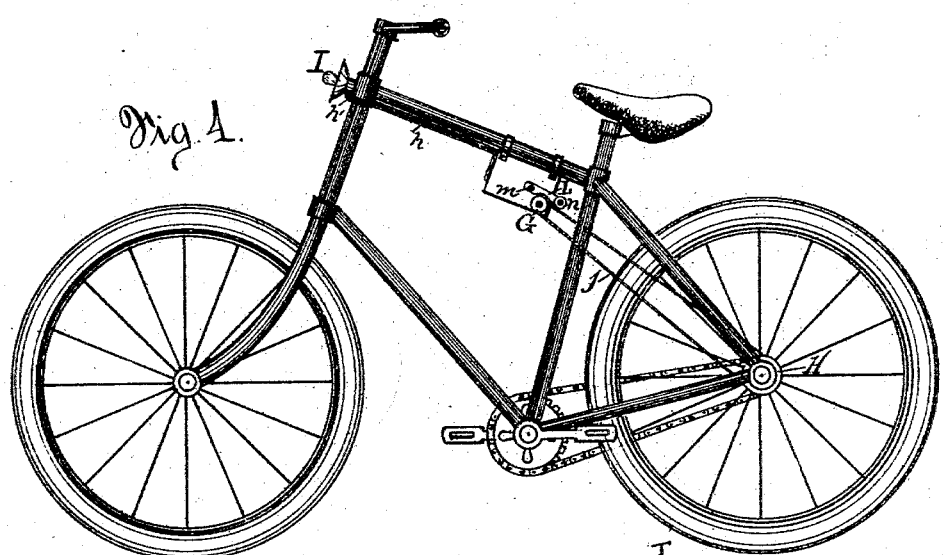
Witnesses:
@@Lake
Arthur Levy
Inventor:
George Mayr.
By— A. Clinton Tanner.
Atty.

UNITED STATES PATENT OFFICE.

GEORGE MAYR, OF BROOKLYN, ASSIGNOR OF ONE-HALF TO ELKIN FARMER, OF NEW YORK, N. Y.

DRIVING MECHANISM FOR BICYCLE-DYNAMOS.

SPECIFICATION forming part of Letters Patent No. 553,035, dated January 14, 1896.

Application filed January 5, 1895. Serial No. 533,945. (No model.)

*To all whom it may concern:*

Be it known that I, GEORGE MAYR, a citizen of the United States, residing at Brooklyn, in the county of Kings and State of New York, have invented certain new and useful Improvements in Electric Lamps for Bicycles and other Vehicles, which improvements are fully set forth in the following specification and accompanying drawings, and in the latter—

Figure 1:
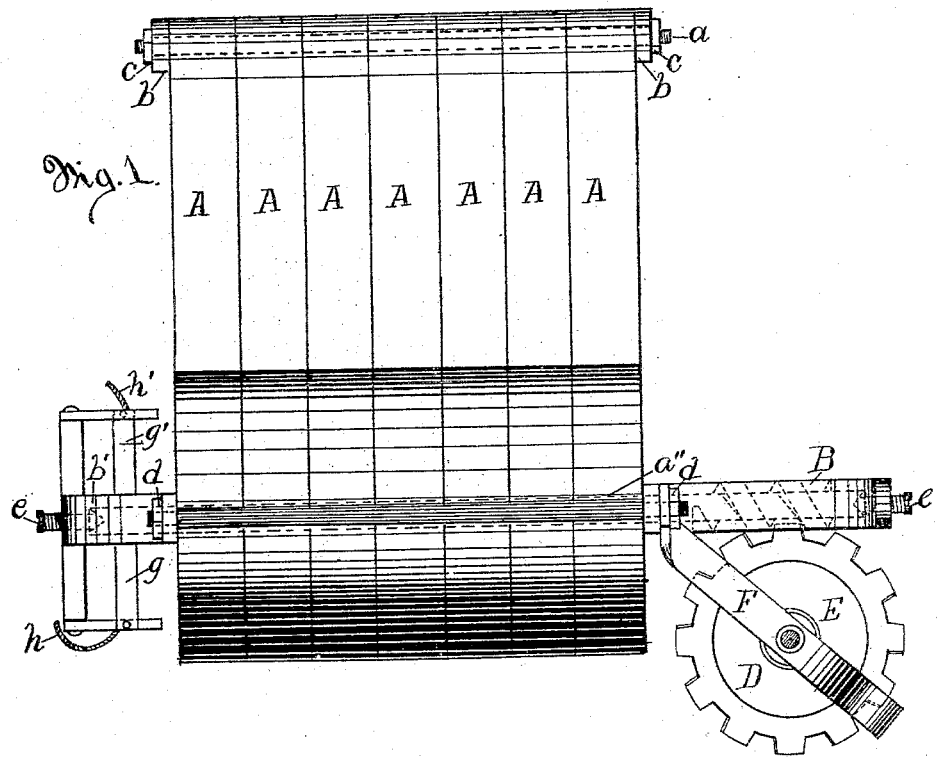
Figure 2:
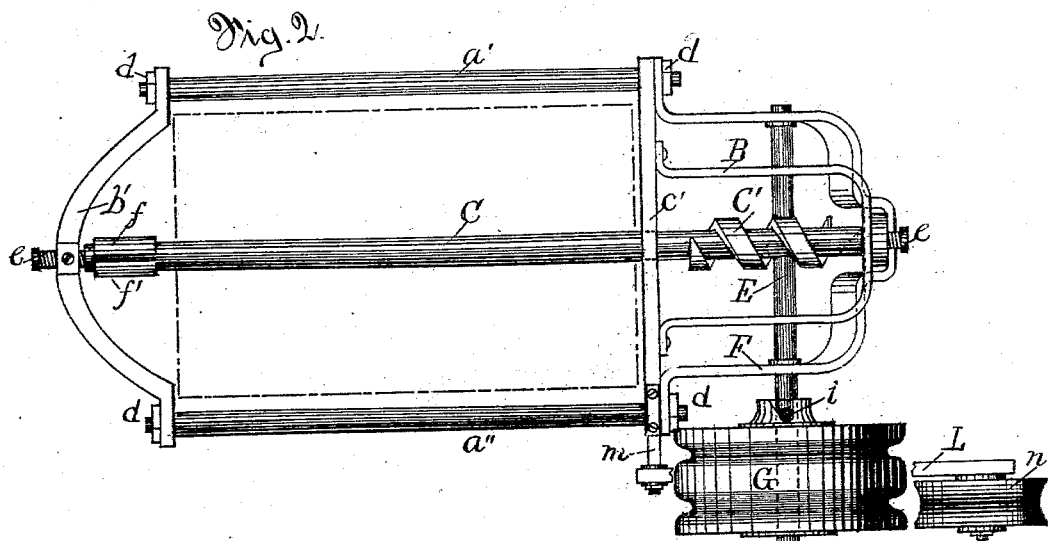

Figure 1 is a side elevation of a generator embodying my improvements, the driven pulley being removed from the spur-wheel shaft. Fig. 2 is a plan view of same, the pulley above referred to being retained in position upon the spur-wheel shaft and the field-magnets being removed. Fig. 3 is an end view. Fig. 4 is a view showing my improved generator applied to a bicycle. Fig. 5 is a detail view showing construction of driving-pulley and application thereof to a rotatable object, as the hub of a bicycle-wheel.

Similar reference-letters denote like parts throughout the several views.

This invention relates generally to that class of appliances known as "bicycle" or "vehicle" lamps, and particularly to that type of lamp in which the production of light is effected through the medium of current-electricity, the latter being generated by means of a dynamo-electric machine. Its object is to provide an electric lamp for bicycles and other moving vehicles in which the current-electricity shall be generated by means of a dynamo-electric machine, the disposition of which, with reference to the bicycle or other vehicle in connection with which it is used, shall be such as to render practicable the communication thereto of motion from some rotatable element of the bicycle or vehicle—as the hub of one wheel of the bicycle or axle of the vehicle—in the event of such element being turned or rotated; which shall admit of ready application to and removal from a bicycle or other vehicle, and which shall be simple and cheap in construction and efficient in operation.

The invention consists of the novel arrangement and disposition of the various parts, of certain combinations thereof, and of certain details of construction, all of which will be specifically referred to hereinafter.

Having reference to the accompanying drawings, the letter A denotes the field-magnets, preferably of the permanent type and in form approximating a horseshoe. These field-magnets may be wound as in common practice, if deemed advisable. At the top they are bound together by means of the rod $a$, plates $b$, and nuts $c$, and near the bottom they are bound together by means of the side rods $a'$ $a''$, end frame-piece $b'$, cross-rod $c'$ and nuts $d$. The frame-piece B is secured to the cross-rod $c'$ in any convenient and well-known manner, as by means of screws.

The armature-shaft C is preferably provided at each end with a pivotal bearing, as the pointed screw $e$, the end of said shaft being suitably recessed to receive this screw.

Armature parts of any approved design may be applied to the shaft C and suitably wound with insulated wire, the latter being properly brought in circuit with the commutator-sections $f$ $f'$, in contact with which stand the brushes $g$ $g'$. Wires $h$ $h'$, respectively, lead from these brushes to the lamp, which may be of any approved construction, and attached to a convenient portion of the bicycle or vehicle frame in any simple manner.

For imparting the essential rotary motion to the armature-shaft I provide the latter, at the rear end thereof, with a worm-thread $C'$ into which mesh the teeth of the spur-wheel D, the latter being firmly mounted upon the shaft E. The teeth of the spur-wheel D are beveled, as shown, to conform to the pitch of the said worm-thread. The shaft E bears centrally and at its rear end in the frame-piece F at right angles to the armature-shaft C. A stop $i$, the function of which will appear later on, passes through the shaft E at a suitable point therein. There is loosely mounted upon the outwardly-projecting end of the shaft E a pulley G, preferably provided with two grooves in its peripheral face. The hub of this pulley G is recessed, as shown, to the end that engagement of this recess by the stop $i$ may be effected through displacement of the pulley G longitudinally inward along the shaft E, and disengagement thereof may be effected by displacement of said pulley in the opposite direction along said shaft. It will be understood that in the former case the shaft E will rotate with the pulley G, thereby imparting the requisite rotary motion to the armature-shaft C through the medium of the spur-wheel D and the thread C', while in the latter case the shaft E will remain stationary, the pulley G rotating thereon. The parts being thus formed and disposed, it is only necessary, when displacement of the pulley G, as stated, becomes desirable, to shift by hand the driving connection $j$ from one groove of the pulley G to the other. To render positive the service of the driving connection, however, I make use of a tightener, which consists of the arm L, disposed and adapted to swing upon a suitable support, as $m$, and a loose pulley $n$, carried by the arm $l$ at the free end thereof. This tightener is so disposed that the pulley $n$ stands in vertical alignment with the driving connection $j$ and rests upon it when the arm $l$ is swung into the position shown.

When my invention is used in connection with a bicycle, I prefer to apply to the hub of one wheel thereof a pulley of common form or made in sections and bolted in place, as shown in Fig. 5; and in the application of my invention to a bicycle the generator is secured in any common manner to a suitable portion of the frame, and a driving pulley, as H, is suitably mounted to receive motion from some rotatable element of the bicycle, and carries the driving connection $j$, which leads to and around the generator-pulley G. Now upon the bicycle-wheel being turned, as when the bicycle is propelled by a rider, proper motion is imparted to the armature-shaft through the medium of the intervening elements, and results in generating the necessary current for feeding the lamp I, which current is conducted to and from said lamp by means of the wires $h$ $h'$.

I do not limit myself to the precise construction shown and described herein, as the details thereof may be materially varied without departing from the spirit of my invention.

What I claim as my invention, and desire to secure by Letters Patent, is—

1. In combination with a bicycle, having a driving medium on one wheel thereof, an electric generator, comprising an armature shaft provided with a worm-thread, and a secondary shaft provided with a stop, as $i$, and carrying a worm-wheel, the latter adapted to mesh with said worm-thread, a pulley, adapted to be thrown into and out of engagement with said stop, on said secondary shaft, and a driving connection on said driving medium and said pulley, all substantially as described and for the purpose set forth.

2. In combination with a bicycle, having a driving medium on one wheel thereof, an electric generator, comprising an armature shaft provided with a worm-thread, and a secondary shaft carrying a worm-wheel and provided with a stop, as $i$, the said worm-wheel being adapted to mesh with said worm-thread, a pulley on the secondary shaft, the said pulley having two peripheral grooves and admitting of being thrown into and out of engagement with said stop, a driving connection on said driving medium and said pulley, and a tightener, adapted to take up the slack in said driving connection, all substantially as described and for the purpose set forth.

GEORGE MAYR.

Witnesses:
A. A. LAKE,
ARTHUR J. LEVY.